United States Patent
Mukaigawa et al.

(10) Patent No.: US 6,246,976 B1
(45) Date of Patent: Jun. 12, 2001

(54) APPARATUS, METHOD AND STORAGE MEDIUM FOR IDENTIFYING A COMBINATION OF A LANGUAGE AND ITS CHARACTER CODE SYSTEM

(75) Inventors: Shinichi Mukaigawa; Toshihiro Fujinami; Hidenobu Kanaoka; Tomoyuki Tada, all of Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 09/042,083

(22) Filed: Mar. 13, 1998

(30) Foreign Application Priority Data

Mar. 14, 1997 (JP) ....... 9-079180

(51) Int. Cl.[7] ............ G06F 17/27; G06F 21/00
(52) U.S. Cl. ............................ 704/9; 704/530
(58) Field of Search .......... 704/1, 8, 9; 707/530, 707/535, 542; 341/51, 28, 65, 66, 107; 345/171

(56) References Cited

U.S. PATENT DOCUMENTS

| 5,418,951 |   | 5/1995  | Damashek . |
|-----------|---|---------|------------|
| 5,533,180 | * | 7/1996  | Zhou et al. ............... 395/150 |
| 5,537,628 | * | 7/1996  | Luebbert ................. 395/144 |
| 5,548,507 |   | 8/1996  | Martino et al. . |
| 5,634,134 | * | 5/1997  | Kumai et al. ............ 704/9 |
| 5,852,680 | * | 12/1998 | Yoshida ................... 382/258 |
| 5,889,481 | * | 3/1999  | Okada ...................... 341/51 |
| 5,907,821 | * | 5/1999  | Kaji et al. ................ 704/4 |
| 5,913,185 | * | 6/1999  | Martino et al. .......... 704/9 |
| 5,959,634 | * | 9/1999  | Yoshida ................... 345/467 |

FOREIGN PATENT DOCUMENTS

| 6-110948 | 4/1994  | (JP) | ............. G06F/15/38 |
|----------|---------|------|-------------------------|
| 7-160715 | 6/1995  | (JP) | . |
| 7-262188 | 10/1995 | (JP) | ............. G06F/15/38 |
| 8-305704 | 11/1996 | (JP) | . |

* cited by examiner

Primary Examiner—Forester W. Isen
Assistant Examiner—Patrick N. Edouard
(74) Attorney, Agent, or Firm—Dickstein Shapiro Morin & Oshinsky LLP

(57) ABSTRACT

The present invention is directed to identifying a language represented by a character code and its character code system. An occurrence probability table describing for each character the probability that a character code occurs is prepared for each combination of a language and a character code system. An entered character code string is divided for each character, and the occurrence probability table is referred to, to obtain the probability that the character code occurs. The product of the occurrence probabilities is calculated for each combination of the language and the character code system, to judge the combination of the language and the character code system with respect to the entered character code string on the basis of the obtained product.

8 Claims, 18 Drawing Sheets

Fig. 3

| LANGUAGE IDENTIFICATION PROGRAM | |
|---|---|
| OCCURRENCE PROBABILITY DATA | TABLE FOR CHINESE (CHINA) |
| | TABLE FOR JAPANESE (EUC CODE) |
| | TABLE FOR JAPANESE (SHIFT-JIS CODE) |
| | TABLE FOR KOREAN |
| | TABLE FOR CHINESE (TAIWAN) |

Fig.6

| 梅花に鴬 | JAPANESE EUC CODE | JAPANESE SHIFT-JIS CODE | CHINESE EUC CODE | TAIWAN BIG 5 CODE | KOREAN EUC CODE |
|---|---|---|---|---|---|
| FIRST CHARACTER | 0.0948% | 0% | 0.0129% | 0.0022% | 10.941% |
| SECOND CHARACTER | 3.2740% | 0% | 0.1118% | 0.2874% | 0.0000% |
| THIRD CHARACTER | 59.155% | 0% | 0.0001% | 0.0000% | 0.0001% |
| FOURTH CHARACTER | 0.0001% | 0% | 0.3717% | 0.0048% | 0.0299% |
| EVALUATION VALUE | 0.0000000001836% | 0% | 0.00000000000005366% | 0% | 0% |

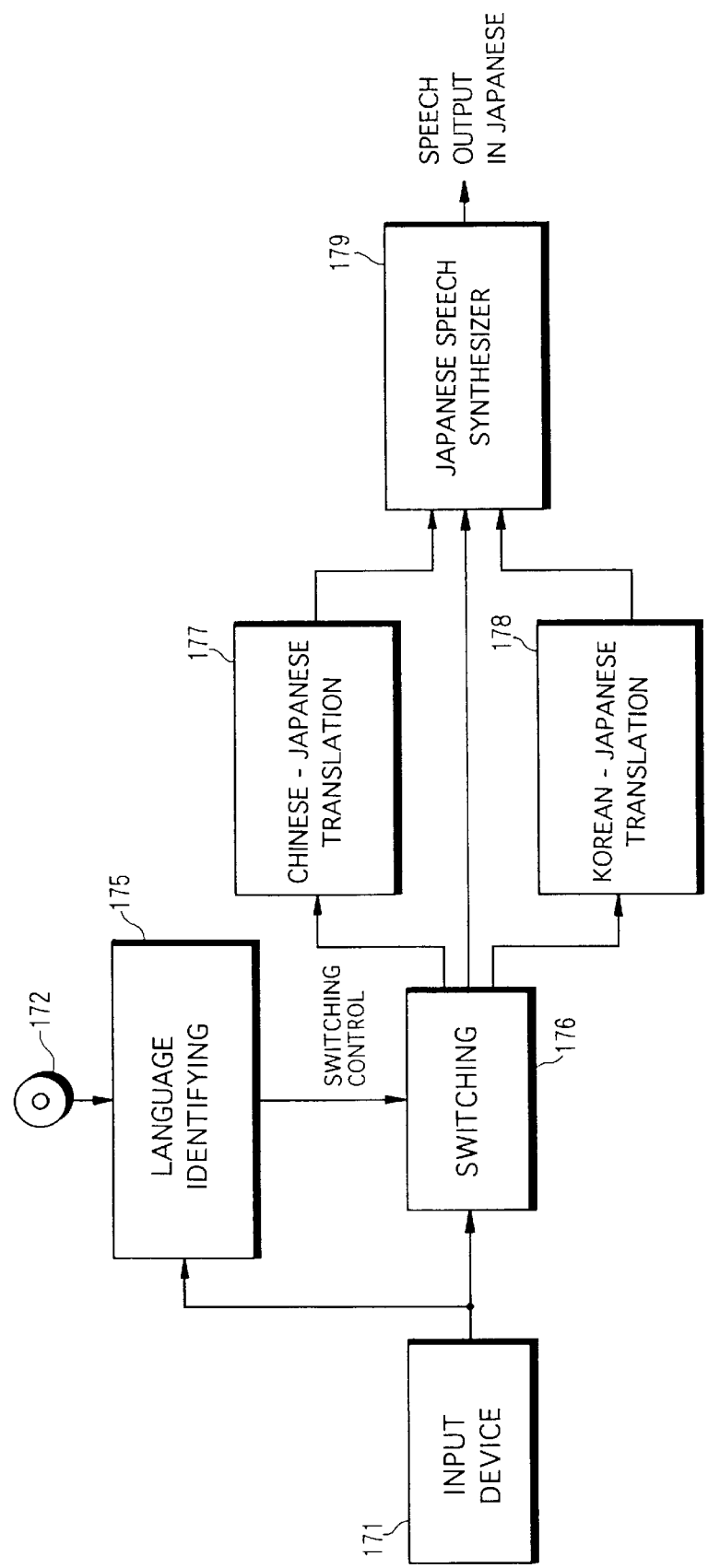

APPARATUS, METHOD AND STORAGE MEDIUM FOR IDENTIFYING A COMBINATION OF A LANGUAGE AND ITS CHARACTER CODE SYSTEM

BACKGROUND OF THE INVENTION

1. Field of the Invention

The present invention relates to a language identifying apparatus and a language identifying method for judging a language of a character string represented by a character code string and the type of its character code (a character code system), various apparatuses for identifying a language of a text (a sentence) or words or a word represented by fed text data or keyword (both are encoded) to switch various types of processing, and a storage medium storing a computer program for controlling the apparatuses or realizing the method.

2. Description of the Background Art

Character codes for kanji (or hangeul) currently used in Japan, China (the People's Republic of China), South Korea, and Taiwan (the Republic of China) represent one character by two bytes. The character codes (systems) are independently defined for each language (Japanese, Chinese, Korean, etc.). Characters in the same language are represented by different character codes if they differ in an encoding method (a character code system, the type or kind of code, or a rule for encoding). Information representing a language is not generally added to character code data. When a series of character codes is fed, therefore, it cannot be simply judged what language is encoded to obtain the character codes.

A language information processing system such as a database search system, a translation system, and a speech synthesis system is constructed on the basis of a particular language and its character code system. Let's consider a language information processing system which is available to a plurality of types of languages. Since language information processing differs depending on the type of language, languages represented by a fed keyword and text data must be found. If the language represented by the fed keyword or text data, and its character code system are not clear, suitable processing cannot be expected.

SUMMARY OF THE INVENTION

An object of the present invention is to make it possible to identify a language represented by a fed character code string and its character code system.

Still another object of the present invention is to make it possible to perform, even when a language represented by an entered keyword or text data and its character code system are not found, various types of language information processing suitable for respective languages.

A character code identifying apparatus according to the first invention is an apparatus for identifying a combination of a language represented by encoded text data and its character code system, characterized by comprising storage device storing for each combination of a language and a character code system a plurality of occurrence probability tables each describing the probability that a character code occurs in the combination, means for respectively reading out the occurrence probabilities from the plurality of occurrence probability tables with respect to one or a plurality of character codes included in the fed text data, to obtain evaluation data for each combination of the language and the character code system, and means for judging the combination of the language represented by the fed text data and the character code system on the basis of the obtained evaluation data.

The first invention also provides a method suitable for the above-mentioned apparatus. That is, the method is characterized by comprising the steps of preparing, for each combination of a language and a character code system, occurrence probability tables each describing the probability that a character code occurs in the combination, respectively reading out the occurrence probabilities from said plurality of occurrence probability tables with respect to one or a plurality of character codes included in fed text data, to obtain evaluation data for each combination of the language and the character code system, and judging the combination of the language represented by the fed text data and the character code system on the basis of the obtained evaluation data.

Furthermore, the present invention also provides a storage medium storing a program for carrying out the above-mentioned method. That is, the storage medium stores a program for identifying a combination of a language represented by encoded text data and its character code system using occurrence probability tables each describing for each combination of a language and a character code system the probability that a character code occurs in the combination, the program controlling a computer so as to respectively read out the occurrence probabilities from the plurality of occurrence probability tables with respect to one or a plurality of character codes included in fed text data, to obtain evaluation data for each combination of the language and the character code system, and to judge the combination of the language represented by the fed text data and the character code system on the basis of the obtained evaluation data. The storage medium is a magnetic disk storage device, a magneto-optic disk storage device, an optical disk storage device, a magnetic tape, a semiconductor memory, etc.

The probability that a character code occurs depends on a combination of a language of characters represented by the character codes and its character code system. Even in the same character code, the probability that the character code occurs differs depending on the language. Even in the same language, the probability that the same character code occurs differs depending on the character code system. The first invention is directed to judging, by paying attention to the occurrence probability of a character code peculiar to the combination of the language and the character code system, the types of a language represented by the character code and its character code system.

According to the first invention, the occurrence probabilities are read out from the occurrence probability tables for each character code in an entered character code string, so that the evaluation data is produced for each combination of the language and the character code system. If the evaluation data related to the occurrence probability is low, it is judged that the possibility that the entered character code string is not related to the combination of the language and the character code system is high. On the other hand, if the evaluation data is high, it is considered that the possibility that the entered character code string is related to the combination of the language and the character code system is high. A combination of a language represented by fed text data (a character code string) and its character code system is thus judged on the basis of evaluation data.

It is preferable that the product of the occurrence probabilities read out from the occurrence probability tables is calculated, to judge a language represented by text data and an encoding method on the basis of the calculated product. If the probability of any one of character codes is zero or very close to zero, the product becomes a very small value, so that a combination of the language and the character code system is clearly excluded.

A multilingual morphological analysis system according to the second invention is characterized by comprising language identification means for identifying a language represented by fed text data, a plurality of morphological analysis means respectively provided with respect to a plurality of languages, and control means for feeding the fed text data to the morphological analysis means suitable for the language identified by the language identification means.

The second invention also provides a method suitable for the above-mentioned apparatus. That is, the method is characterized by comprising the steps of providing a plurality of morphological analysis devices with respect to a plurality of languages, identifying a language represented by fed text data, and feeding the fed text data to the morphological analysis device suitable for the identified language.

The second invention also provides a storage medium storing a program for carrying out the above-mentioned method. That is, the storage medium is a computer readable storage medium storing a program for switching the feed of text data to a plurality of morphological analysis devices respectively provided with respect to a plurality of languages, the program controlling a computer so as to identify a language represented by fed text data, and to feed the fed text data to the morphological analysis device suitable for the identified language.

According to the second invention, the morphological analysis devices are respectively provided in correspondence with the plurality of languages. The language represented by the fed text data is identified. The text data is fed, depending on the identified language, to the morphological analysis device suitable for the language. Even if it is not understood what language is related to the entered text data, the most suitable morphological analysis is performed.

A multilingual search system according to the third invention is characterized by comprising language identification means for identifying a language represented by a fed keyword, a plurality of search means or devices respectively provided with respect to a plurality of languages for outputting, on the basis of an entered keyword, information related to the keyword, and control means for feeding the fed keyword to the search means or device suitable for the language identified by the language identification means.

The third invention also provides a method suitable for the above-mentioned system. That is, the method is characterized by comprising the steps of providing a plurality of search devices for outputting, on the basis of an entered keyword, information related to the keyword with respect to a plurality of languages, identifying a language represented by a fed keyword, and feeding the fed keyword to the search device suitable for the identified language.

Furthermore, the third invention also provides a storage medium storing a program for carrying out the above-mentioned method. That is, the storage medium is a computer readable storage medium storing a program for switching the feed of a keyword to a plurality of search devices respectively provided with respect to a plurality of languages for outputting, on the basis of an entered keyword, information related to the keyword, the program controlling a computer so as to identify a language represented by a fed keyword, and to feed the fed keyword to the search device suitable for the identified language.

According to the third invention, the search devices are respectively provided in correspondence with the plurality of languages.

The language of the fed keyword is identified. The keyword is fed, depending on the identified language, to the search device suitable for the language.

Even if it is not understood what language is related to the entered keyword, the most suitable search processing can be realized.

A multilingual output system according to the fourth invention is characterized by comprising language identification means for identifying a language represented by fed text data, an output device for outputting a text represented by the text data, and output format control means for controlling the output format of the text in the output device on the basis of the language identified by the language identification means.

The fourth invention also provides a method suitable for the above-mentioned apparatus. That is, the method is characterized by comprising the steps of identifying a language represented by fed text data, and controlling the output format of the text represented by the text data in an output device for outputting the text on the basis of the identified language.

The fourth invention also provides a storage medium for realizing the above-mentioned method. That is, the storage medium is a computer readable storage medium storing a program for controlling a computer so as to identify a language represented by fed text data, and control the output format of a text represented by the text data in an output device for outputting the text on the basis of the identified language.

According to the fourth invention, the language of the fed text data is identified. The output format of the text (for example, selection of the type of font, vertical writing or horizontal writing, such output as to read from the left to the right or such output as to read from the right to the left, etc.) is controlled on the basis of the identified language. The most suitable output corresponding to the language is possible.

The output device is a printer, for example. In the case, the printing format of the text in the printer is controlled.

When the output device is a display device, the display format in the display device is controlled.

A multilingual translation system according to the fifth invention is characterized by comprising language identification means for identifying a language represented by fed text data, a plurality of translation means or devices each provided with respect to a combination of two languages for translating one of the languages into the other language and outputting the other language, and control means or devices for feeding the fed text data to the translation means or device suitable for the language identified by the language identification means.

The fifth invention also provides a method suitable for the above-mentioned system. That is, the method is characterized by comprising the steps of providing a plurality of translation devices with respect to combinations of two languages each for translating one language into the other language and outputting the other language, identifying a language represented by fed text data, and feeding the fed text data to the translation device suitable for the identified language.

The fifth invention also provides a storage medium for carrying out the above-mentioned method. That is, the storage medium is a storage medium storing a program for switching entry of text data to a plurality of translation devices each provided with respect to a combination of two languages for translating one of the languages into the other language and outputting the other language, the program controlling a computer so as to identify a language represented by fed text data, and to feed the fed text data to the translation device suitable for the identified language.

According to the fifth invention, each of the translation means or device is provided with respect to the combination of the two languages.

The language of the fed text data is identified. The text data is fed, depending on the identified language, to the translation means or device suitable for the language.

Even if the language represented by the entered text data is not found, the language can be translated into a predetermined language.

The language obtained by the translation can be also outputted upon being converted into speech.

A multilingual word processor according to the sixth invention is characterized by comprising text data storage means for storing text data related to a plurality of languages, language identification means for identifying languages represented by the text data stored in the text data storage means or by entered text data, language input means provided for each type of language for converting the entered text data into text data suitable for a language system of a text represented by the text data, and control means for carrying out such control that the entered text data is fed to the language input means of the language suitable for the text data on the basis of the results of the identification in the language identification means.

The sixth invention also provides a method suitable for the above-mentioned apparatus. That is, the method is characterized by comprising the steps of storing text data related to a plurality of languages, providing language input means for converting for each language represented by entered text data the entered text data into text data suitable for a language system of a text represented by the text data, identifying the languages represented by the stored text data or by the entered text data, and carrying out such control as to feed the entered text data to the language input means of the language suitable for the text data on the basis of the results of the language identification.

The sixth invention also provides a storage medium for carrying out the above-mentioned method. That is, the storage medium is a computer readable storage medium storing a program for feeding, when text data related to a plurality of languages are stored, and there are provided language input devices each for converting, for each language entered text data, the entered text data into a language system of a text represented by the text data, the entered text data to the language input device suitable for the text data, the program controlling a computer so as to identify the languages respectively represented by the stored text data or by the entered text data, and to feed the entered text data to the language input device of the language suitable for the text data.

According to the sixth invention, the text data related to the plurality of languages are stored. The language of the stored text data or the entered text data is identified. The entered text data is fed to the language input means or device of the language suitable for the text data depending on the results of the identification.

A multilingual speech synthesis system according to the seventh invention is characterized by comprising language identification means for identifying a language represented by fed text data, a plurality of speech synthesizers respectively provided with respect to a plurality of languages for converting a text represented by entered text data into speech and outputting the speech, and control means for feeding the fed text data to the speech synthesizer suitable for the language identified by the language identification means.

The seventh invention also provides a method suitable for the above-mentioned system. That is, the method is characterized by comprising the steps of providing a plurality of speech synthesizers for converting a text represented by entered text data into speech and outputting the speech with respect to a plurality of languages, identifying a language represented by fed text data, and feeding the fed text data to the speech synthesizer suitable for the identified language.

The seventh invention also provides a storage medium for carrying out the above-mentioned method. That is, the storage medium is a computer readable storage medium storing a program for switching entry of text data to a plurality of speech synthesizers respectively provided with respect to a plurality of languages for converting a text represented by entered text data into speech and outputting the speech, the program controlling a computer so as to identify a language represented by fed text data, and to feed the fed text data to the speech synthesizer suitable for the identified language.

According to the seventh invention, the speech synthesizers are respectively provided in correspondence with the plurality of languages.

It is judged which language is related to the fed text data. The text data is fed, depending on the identified language, to the speech synthesizer suitable for the language.

Even if it is not understood what language is related to the entered text data, the text represented by the text data is outputted in speech in a predetermined language.

A multilingual processing system according to the eighth invention is characterized by comprising language identification means for identifying a language represented by fed text data, a plurality of processing means respectively provided with respect to a plurality of languages, and control means for feeding the fed text data to the processing means suitable for the language identified by the language identification means.

The eighth invention also provides a method suitable for the above-mentioned system. That is, the method is characterized by comprising the steps of providing a plurality of processing device with respect to a plurality of languages, identifying a language represented by fed text data, and feeding the fed text data to the processing device suitable for the identified language.

The eighth invention also provides a storage medium storing a program for carrying out the above-mentioned method. That is, the storage medium is a computer-readable storage medium storing a program for switching entry of text data to a plurality of processing devices respectively provided with respect to a plurality of languages, the program controlling a computer so as to identify a language represented by fed text data, and to feed the fed text data to the processing device suitable for the identified language.

According to the eighth invention, the processing means or devices are respectively provided in correspondence with the plurality of languages.

The language represented by the fed text data is identified. The text data is fed, depending on the identified language, to the processing means or device suitable for the language.

Even if it is not understood what language is related to the entered text data, the most suitable processing is performed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 illustrates the data structure of a storage medium used in the language identification apparatus for a character code;

FIG. 6 illustrates probabilities that character codes representing a predetermined phrase occur for each combination of a language and a character code system;

FIG. 19 illustrates the outline of the electrical construction of a multilingual speech synthesis system.

DESCRIPTION OF THE PREFERRED EMBODIMENTS

First Embodiment

The present embodiment relates to an apparatus for identifying a language of a character code or a character code string.

Figure 1:
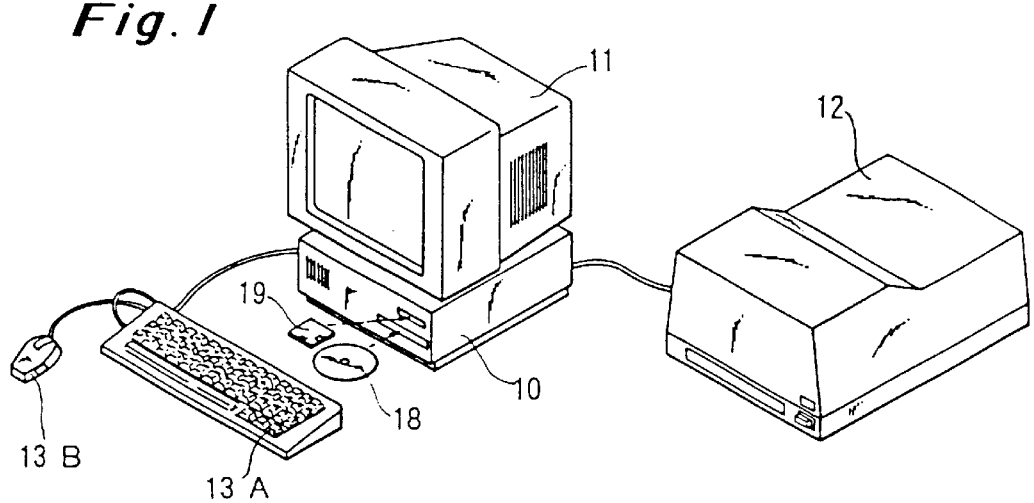
FIG. 1 illustrates the appearance of an apparatus for identifying a language of a character code.
Figure 2:
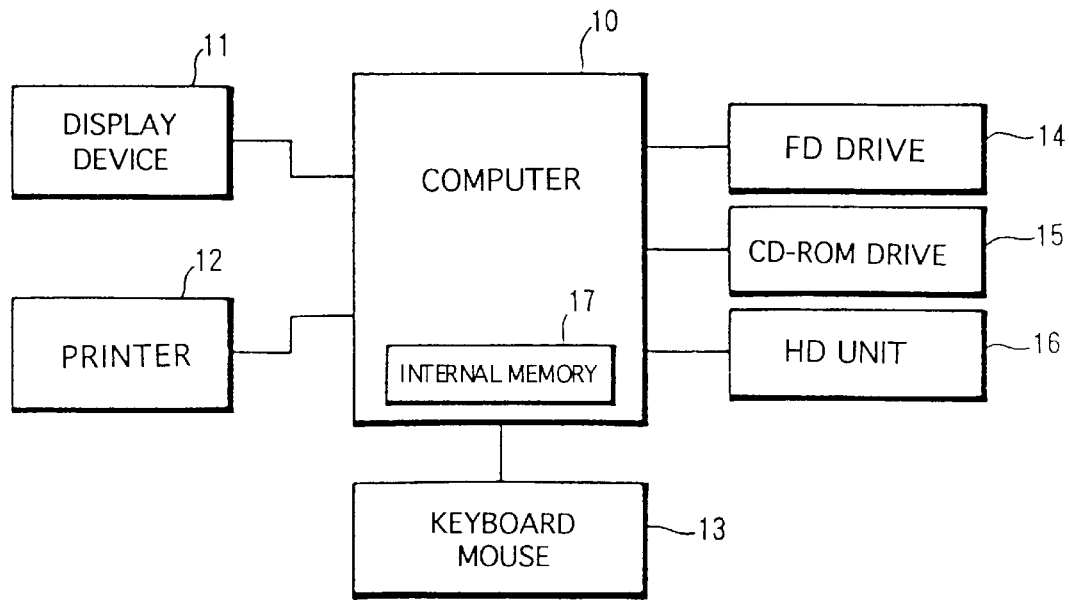
FIG. 2 illustrates the outline of the electrical construction of the language identification apparatus for a character code.

FIG. 1 illustrates the appearance of a language identifying apparatus for a character code, and FIG. 2 illustrates the outline of the electrical construction thereof.

The language identifying apparatus for a character code comprises a computer 10. A CRT display device (or a liquid crystal display panel) 11, a printer 12, and input devices (a keyboard 13A and a mouse 13B) are connected to the computer 10. An FD drive 14, a CD-ROM drive 15, and an HD unit 16 are provided inside the computer 10. The FD drive 14 writes data to an FD (floppy disk) 19 and reads out data from the FD 19. The CD-ROM drive 15 reads out data from a CD-ROM (compact disk read-only memory) 18. The HD unit 16 writes data to an HD (hard disk) (not shown) and reads out data from the HD. The computer 10 further comprises an internal memory (a semiconductor memory, etc.) 17.

A language identification program for language identification of a character code and occurrence probability data used for the language identification are stored in the CD-ROM 18. The contents thereof are shown in FIG. 3. The occurrence probability data represents the probability that a character code (i.e., a character) occurs or appears. The occurrence probability for each character is previously found by statically processing the character appearing in various documents in the past. The occurrence probability data may be obtained with respect to only typical character or characters, or may be obtained with respect to all characters for each language. The occurrence probability data is stored in the form of a table for each combination of a language and a character code system (the type of character code or an encoding method). In the present embodiment, there are tables (occurrence probability tables) for Chinese (for China and Taiwan), tables for Japanese (an EUC (Extended UNIX Code) code and a Shift-JIS (Japanese Industrial Standards) code), and a table for Korean. Japanese is generally encoded by the EUC code or the Shift-JIS code. The EUC code or the Shift-JIS code is a character code system or an encoding method. Consequently, not only the type of the language but also the character code system can be identified. The same is true for the other languages other than Japanese. The Japanese Shift-JIS code can be converted into the Japanese EUC code. Therefore, only the EUC code table may be provided with respect to Japanese, as in an example of language identification processing as described later.

The program and the data which are stored in the CD-ROM 18 are read out from the CD-ROM 18 and are stored in the HD when the language identifying apparatus for a character code is started. In the language identification processing of the character code, parts of the program and the data are temporarily stored or are developed as required in the internal memory 17.

Figure 4:
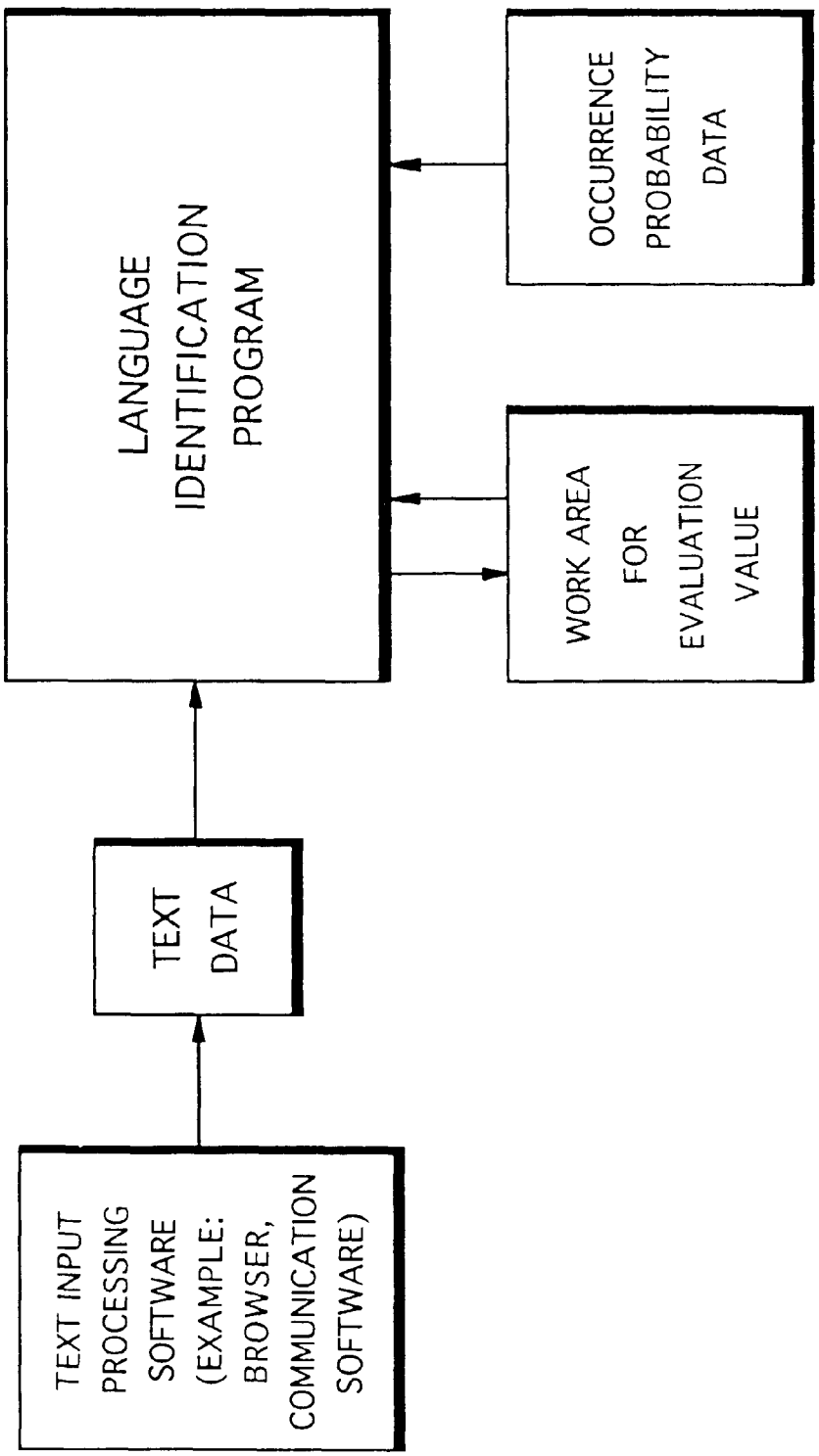
FIG. 4 illustrates the relationship among entered data to be processed, a language identification program, and occurrence probability data.

FIG. 4 schematically illustrates the relationship among entered data to be processed, a language identification program, and occurrence probability data.

Text data entered by text input processing software such as a browser or communication software (or through the keyboard 13A) is cut down (or segmented) for each character by the language identification program, and the occurrence probability data is found for each combination of a language (Japanese, Chinese or Korean) and a character code system with respect to the character obtained by the cutting. The found occurrence probability is subjected to statical processing (multiplication processing as described later) in a work area for an evaluation value (a part of the internal memory 17), so that the combination of the language represented by the entered text data and the character code system is finally identified.

Figure 5:
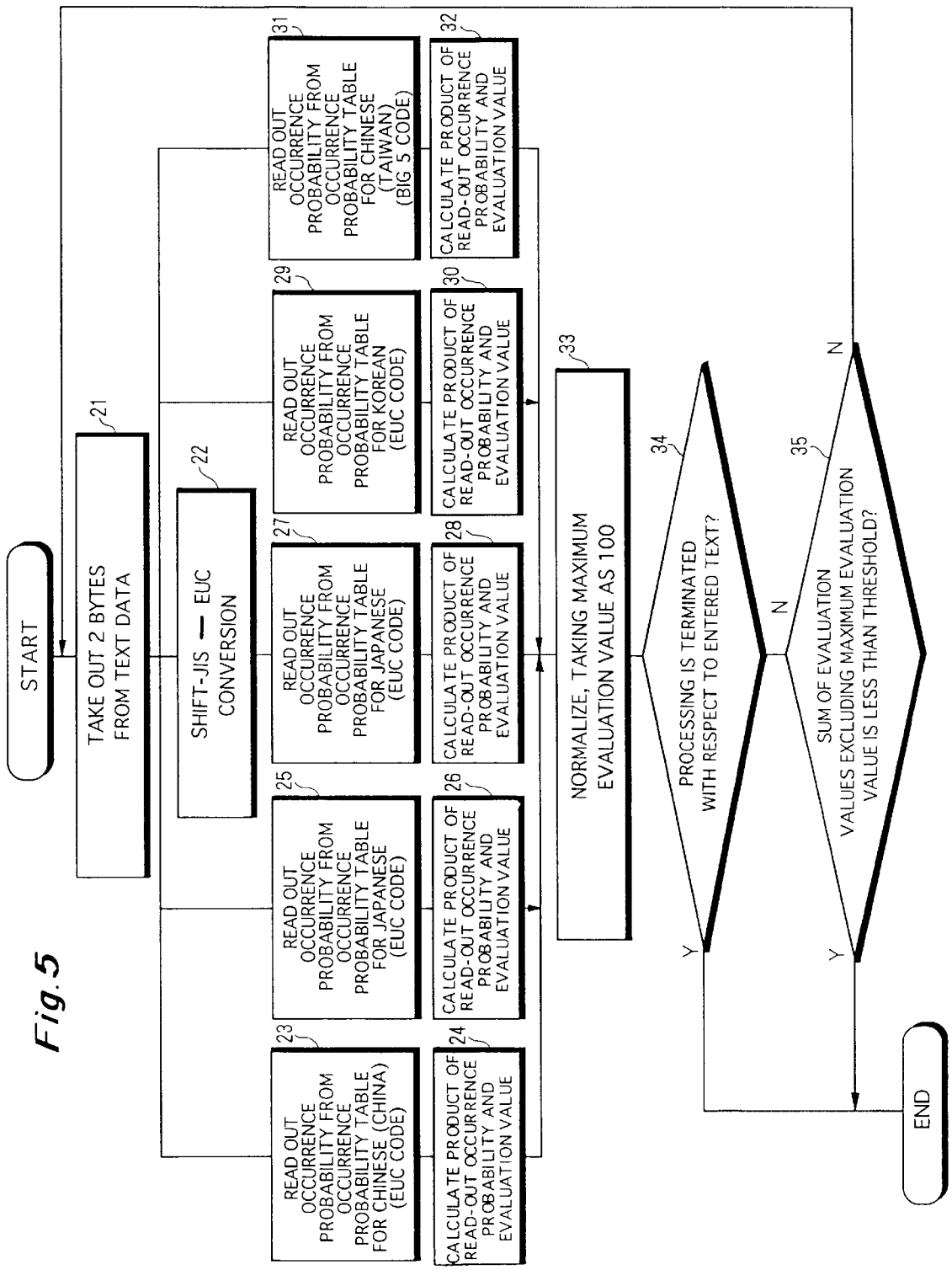
FIG. 5 illustrates the procedure for processing of a language identification system for a character code.

FIG. 5 is a flow chart showing the procedure for character code identification processing in a character code identifying apparatus. In this processing, description is made of an example in which when a character code string representing a phrase "梅花に鶯" (the character code string is represented by, for example, 0xC7DF, 0xB2D6, 0xA4CB and 0xB2A9 in the Japanese EUC code, and 0x947E, 0x89D4, 0x82C9 and 0x89A7 in the Japanese Shift-JIS code, where 0x represents a hexadecimal number) is entered from the keyboard, it is judged which combination of a language and a character code system corresponds to the entered character code string. In FIG. 6, the probabilities that character codes constituting the phrase "梅花に鶯" occur for each combination of a language and a character code system is expressed in a value normalized, taking the maximum occurrence probability as 100%, in each of the occurrence probability tables.

Data corresponding two bytes (one character) is taken out from the entered text data (step 21).

The probability that the data (a character code) corresponding to the taken-out two bytes occurs is read out from the occurrence probability table for each combination of a language and a character code system (steps 23, 25, 29 and 31). On the other hand, the data corresponding to the taken-out two bytes is converted into the EUC code from the Shift-JIS code (step 22), and the probability of the character code which has been converted to the EUC code is read out from the occurrence probability table for Japanese (the EUC code) (step 27).

A character code corresponding to the first character "梅" in "梅花に鶯", has an occurrence probability of 0.0948% in the Japanese EUC code system, 0% in the Japanese Shift-JIS code system, 0.0129% in the Chinese (for China) EUC code system, 0.0022% in the Chinese (for Taiwan) Big 5 code system, and 10.941% in the Korean EUC code system.

The product of the occurrence probability read out and the evaluation value already calculated is calculated, and the calculated product is taken as a new evaluation value (the updating of the evaluation value) (steps 24, 26, 28, 30 and 32). The calculation is performed for each combination of a language and a character code system (i.e., for each occurrence probability table). One is set as an initial value of the evaluation value. In the case of the character code corresponding to the first character, the occurrence probability read out and one are multiplied.

The other evaluation values than that having the maximum value are normalized, taking an evaluation value having the maximum value out of evaluation values thus updated as 100 (step 33). This is for performing processing for comparison with a threshold in the following step 35.

Unless the above-mentioned processing is terminated with respect to all character codes constituting the entered text data (step 34), the sum of all the other evaluation values excluding the evaluation value having the maximum value is calculated. If the calculated sum is not more than a predetermined threshold (YES in step 35), it is judged that the entered text data corresponds to a combination of a language and a character code system which gives the evaluation value having the maximum value. If the calculated sum exceeds the predetermined threshold (NO in step 35), the processing from the step 21 to the step 34 is repeated again.

The probability that a character code corresponding to the second character "花" in "梅花に鶯" occurs is 3.2740% in the Japanese EUC code, 0% in the Japanese Shift-JIS code, 0.1118% in the Chinese (for China) EUC code, 0.2874% in the Chinese (for Taiwan) Big 5 code, and 0% in the Korean EUC code.

The probability that a character code corresponding to the third character "に" in "梅花に鶯" occurs is 59.155% in the Japanese EUC code, 0% in the Japanese Shift-JIS code, 0.0001% in the Chinese (for China) EUC code, 0% in the Chinese (for Taiwan) Big 5 code, and 0.0001% in the Korean EUC code.

The probability that a character code corresponding to the fourth character "鶯" in "梅花に鶯" occurs is 0.0001% in the Japanese EUC code, 0% in the Japanese Shift-JIS code, 0.3717% in the Chinese (for China) EUC code, 0.0048% in the Chinese (for Taiwan) Big 5 code, and 0.0299% in the Korean EUC code.

The product of the occurrence probabilities of the character codes corresponding to the four characters constituting "梅花に鶯" is obtained as a final evaluation value. This means that the above-mentioned processing is terminated with respect to all the character codes constituting the entered text data (YES in step 34). The final evaluation value is 0.000000001836% in the Japanese EUC code, 0% in the Japanese Shift-JIS code, 0.000000000005366% in the Chinese (for China) EUC code, 0% in the Chinese (for Taiwan) Big 5 code, and 0% in the Korean EUC code. When the values are compared with each other, the evaluation value in the Japanese EUC code is the largest, so that it is judged that "梅花に鶯" is Japanese and is represented by the EUC code. A language written with characters represented by a character code and the type of the character code (a character code system or an encoding method) are thus identified. In a case where the entered text data includes a lot of character codes, the answer is generally in the affirmative in the step 35 when the processing with respect to three to four characters is terminated, so that the judgment of a combination of the language represented by the entered text data and the character code system will be terminated.

Second Embodiment

The present embodiment relates to a multilingual morphological analysis system.

Figure 7:
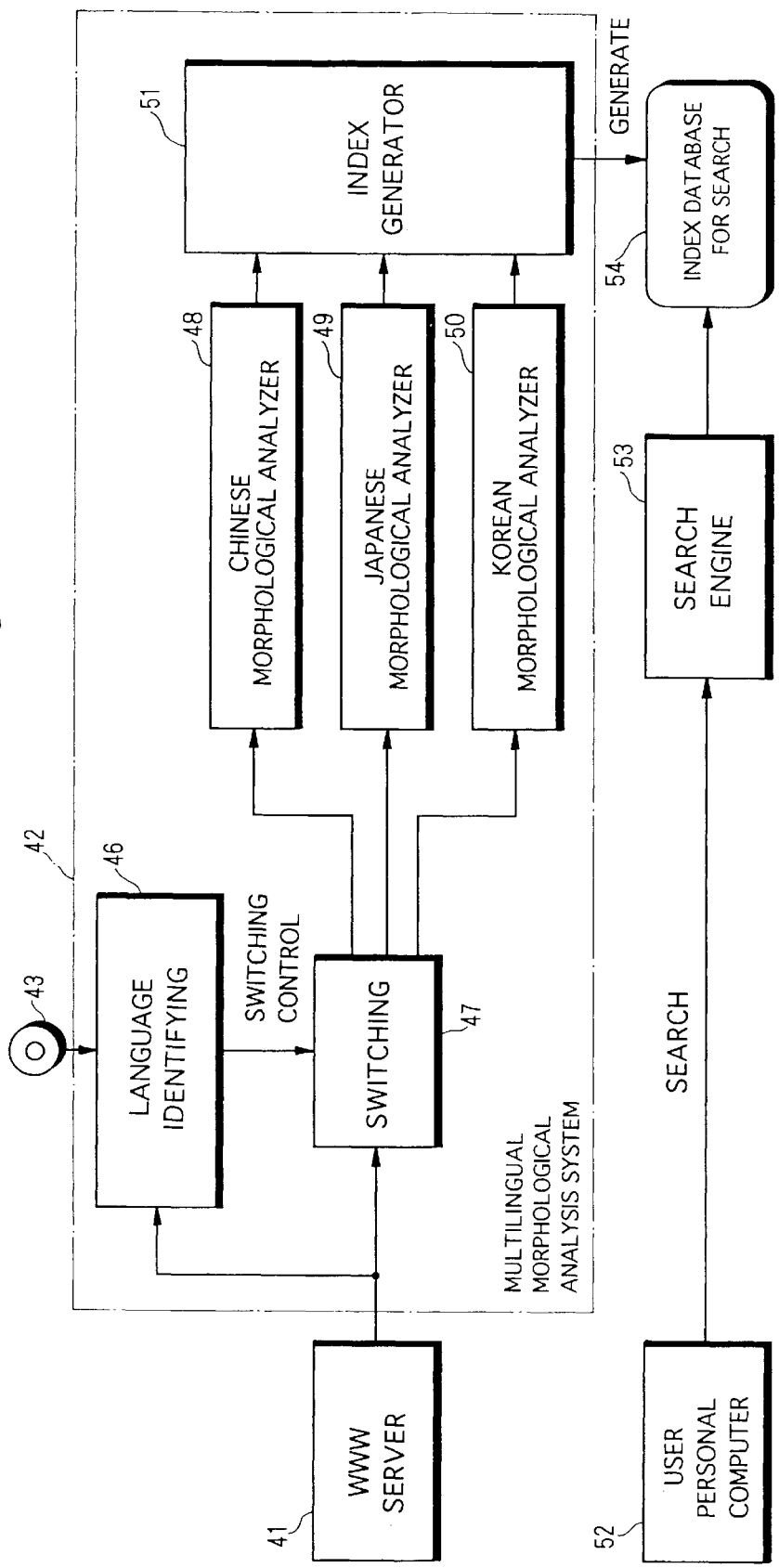
FIG. 7 is a block diagram showing the outline of the electrical construction of a multilingual morphological analysis system.
Figure 8:
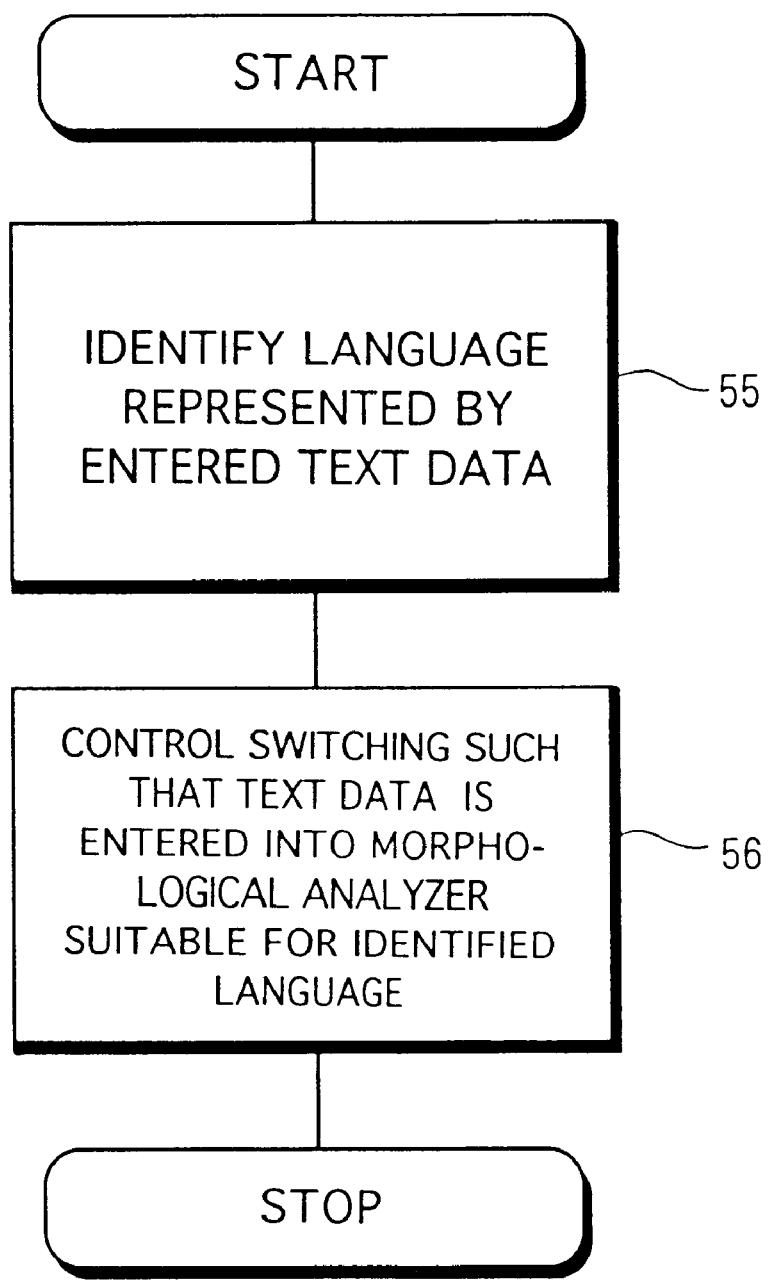
FIG. 8 illustrates the outline of the procedure for processing in the multilingual morphological analysis system.

FIG. 7 is a block diagram showing the outline of the electrical construction of the multilingual morphological analysis system, and FIG. 8 shows the outline of the procedure for processing.

The multilingual morphological analysis system comprises a plurality of morphological analyzers for a plurality of types of languages, and feeds entered text data to the morphological analyzer suitable for the type of language of a text represented by the text data, to perform morphological analysis.

A program realizing the procedure for the processing shown in FIG. 8 is stored in a CD-ROM 43. The CD-ROM 43 is loaded in a language identifying device 46, so that the program and data which are stored in the CD-ROM 43 are read.

The text data is entered into a multilingual morphological system 42 from a www server 41. The text data is entered into the language identifying device 46 and a switching device 47. A language of a text represented by the entered text data (a combination of the language and the character code system if required; The same shall apply hereinafter) is identified in the language identifying device 46 (step 55). The identification processing may be performed by the above-mentioned method in the first embodiment, may be also performed by checking whether or not a character peculiar to a language is included in the text, or may be also performed by a method using so-called N-gram of characters or a rule concerning a character string.

In any case, when the language is identified, the switching of the switching device 47 is controlled by the language identifying device 46 such that the entered text data is entered into a morphological analyzer (any one of 48, 49 and 50) corresponding to the identified language (step 56). Consequently, the entered text data is fed to the morphological analyzer 48, 49 or 50 suitable for the text data, to perform suitable morphological analysis.

The results of the morphological analysis are given to an index generator 51, so that an index related to the entered text data is generated. The generated index is stored in an index database 54 for search. The index database 54 for search is accessed using a search engine 53, so that a user can perform desired search processing using his or her own computer 52.

In the foregoing, examples of the Japanese morphological analyzer include IntelliScope Search Enhancer manufactured by Inso Corporation, Breakfast manufactured by Fujitsu, Ltd., Shunji manufactured by Gengo Kougaku Laboratory Inc., Juman developed by Nagao Laboratory, Kyoto University, Faculty of Engineering, Dept. of Electrical Engineering, and Chase developed by Matsumoto Lab, Nara Institute of Science and Technology, the Graduate School of Information Science, Computational Linguistics Laboratory, examples of Korean morphological analyzer include KoCha developed by Matsumoto Lab, Nara Institute of Science and Technology, the Graduate School of Information Science, Computational Linguistics Laboratory, examples of the Chinese (for China) morphological analyzer include Chinese Segmenter developed by New Mexico University CRL, and Modern Chinese text segmentation and part-of-speech regulation developed by Beijing University, and examples of the English morphological analyzer include IntelliScope Search Enhancer manufactured by Inso Corporation.

Although the illustrated multilingual morphological analysis system is divided into the language identifying device 46, the switching device 47, the morphological analyzers 48, 49 and 50, and the index generator 51 from the functional point of view, these devices can be realized by one or a plurality of computers. This also applies in the other embodiments described below. The personal computer 52, the search engine 53 and the index database 54 for search may be included in the multilingual morphological analysis system.

Third Embodiment

The present embodiment relates to a multilingual search system.

Figure 9:
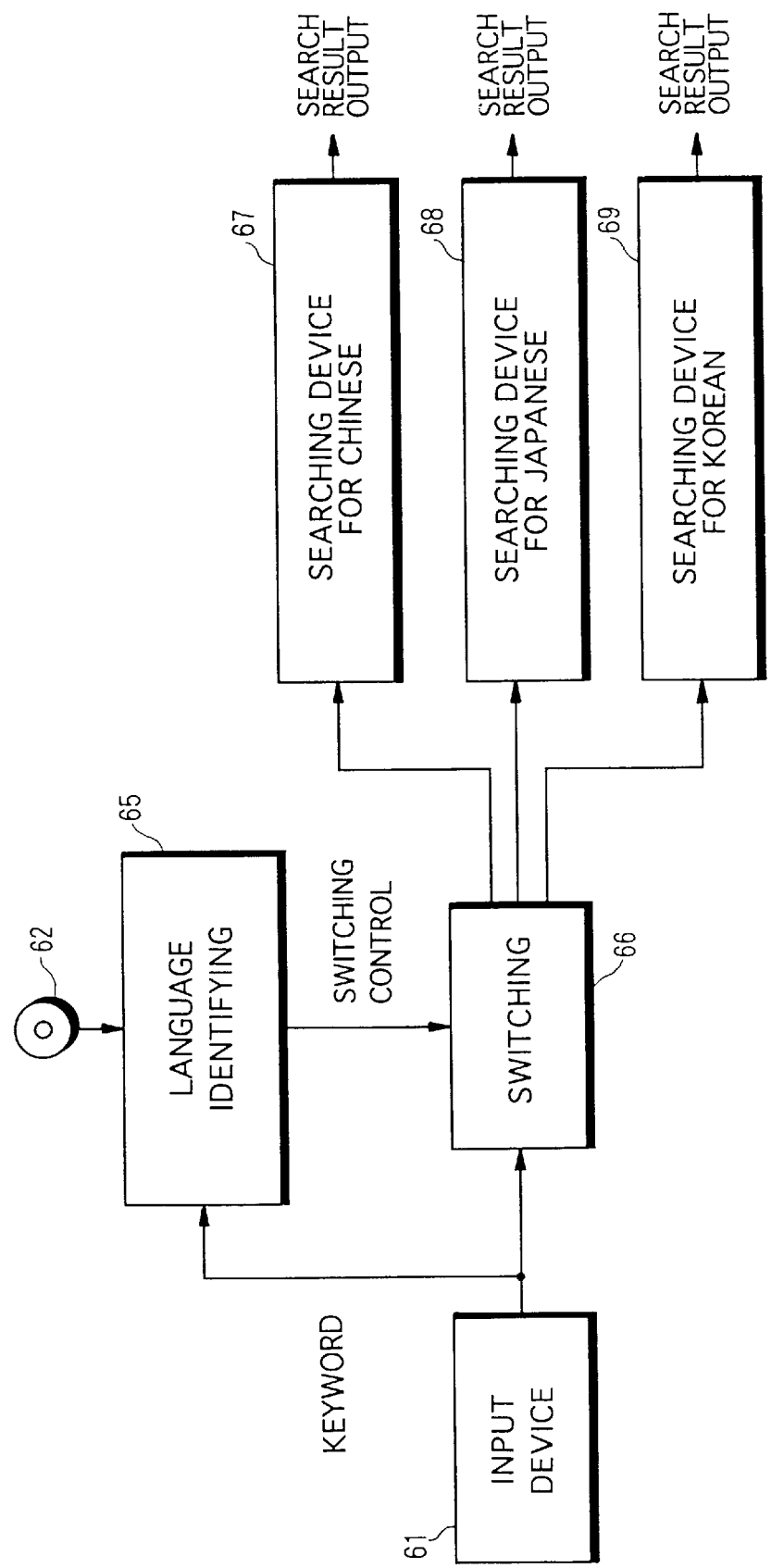
FIG. 9 is a block diagram showing the outline of the electrical construction of a multilingual search system.
Figure 10:
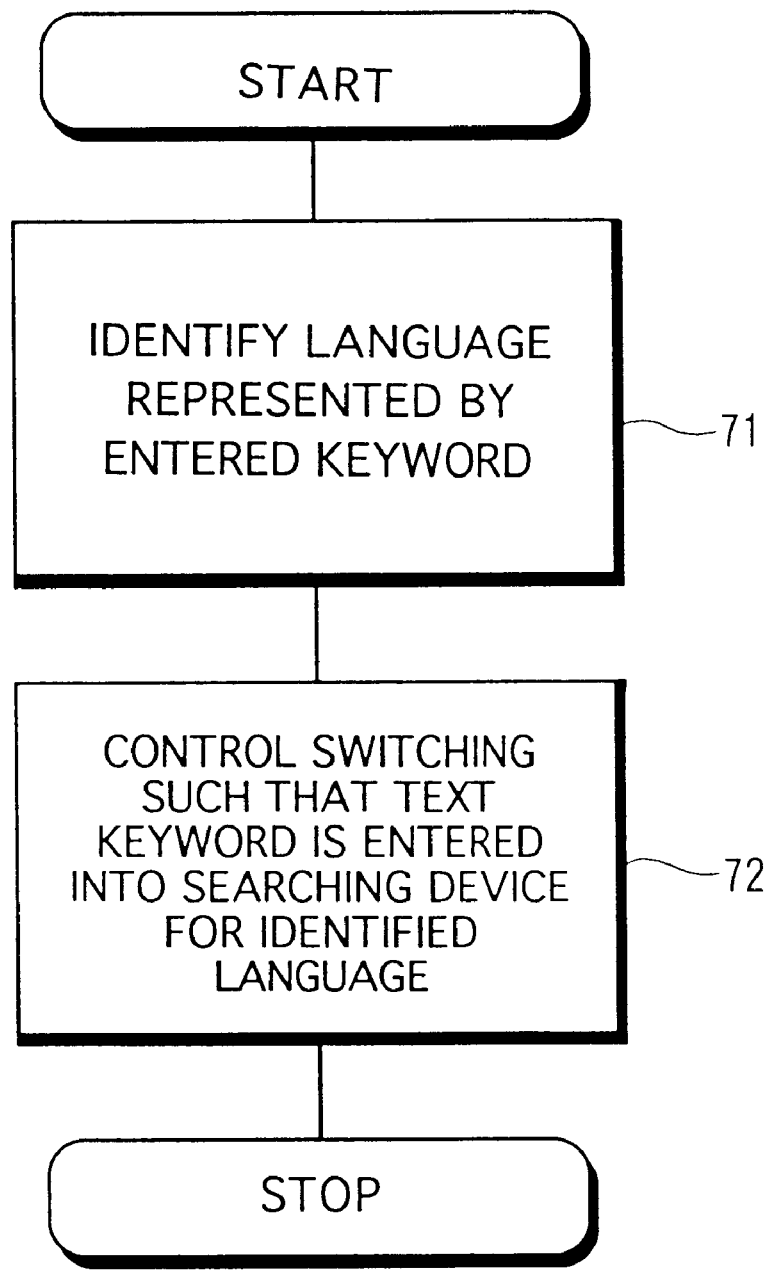
FIG. 10 illustrates the outline of the procedure for processing in the multilingual search system.

FIG. 9 is a block diagram showing the outline of the electrical construction of the multilingual search system, and FIG. 10 shows the procedure for processing.

The multilingual search system has a plurality of searching devices for different languages, and feeds text data to the searching device suitable for the type of language of a text represented by entered text data, to perform search processing.

A program realizing the processing shown in FIG. 10 is stored in a CD-ROM 62. The CD-ROM 62 is loaded in a language identifying device 65, so that the program and data which are stored in the CD-ROM 62 are read.

The text data is entered by an operator, for example, using an input device 61. A keyword entered from the input device 61 is entered into the language identifying device 65 and a switching device 66. The type of language represented by the entered keyword is identified in the language identifying device 65 (step 71).

When the type of the language represented by the keyword is identified, the switching of the switching device 66 is controlled by the language identifying device 65 such that the entered keyword is entered into a searching device 67, 68 or 69 for the language of the identified type (step 72). Consequently, the entered keyword is fed to the searching device 67, 68 or 69 suitable for the language represented by the keyword, to perform search processing based on the keyword. The results of the search are outputted from the language searching device 67, 68 or 69.

As described in the foregoing, the search processing is performed irrespective of the type of the language represented by the keyword and even if the language is not found in advance. The multilingual search system can be also realized by one or a plurality of computers.

Fourth Embodiment

The present embodiment relates to a multilingual output device.

Figure 11:
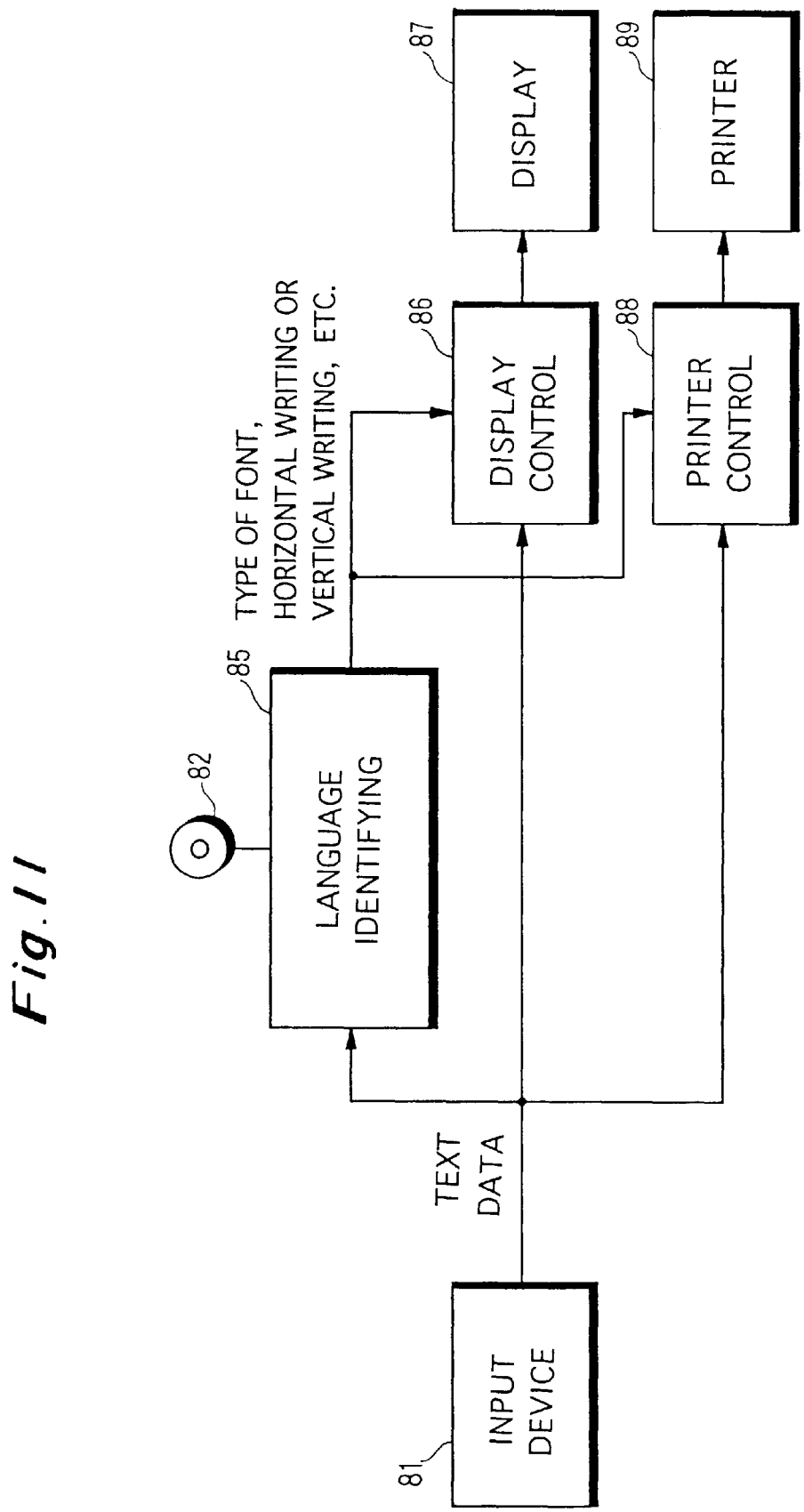
FIG. 11 is a block diagram showing the outline of the electrical construction of a multilingual output system.

FIG. 11 is a block diagram showing the outline of the electrical construction of the multilingual output device, and FIG. 10 shows the outline of the procedure for processing.

The multilingual output device controls the output format of a text represented by entered text data depending on the type of language of the text.

Figure 12:
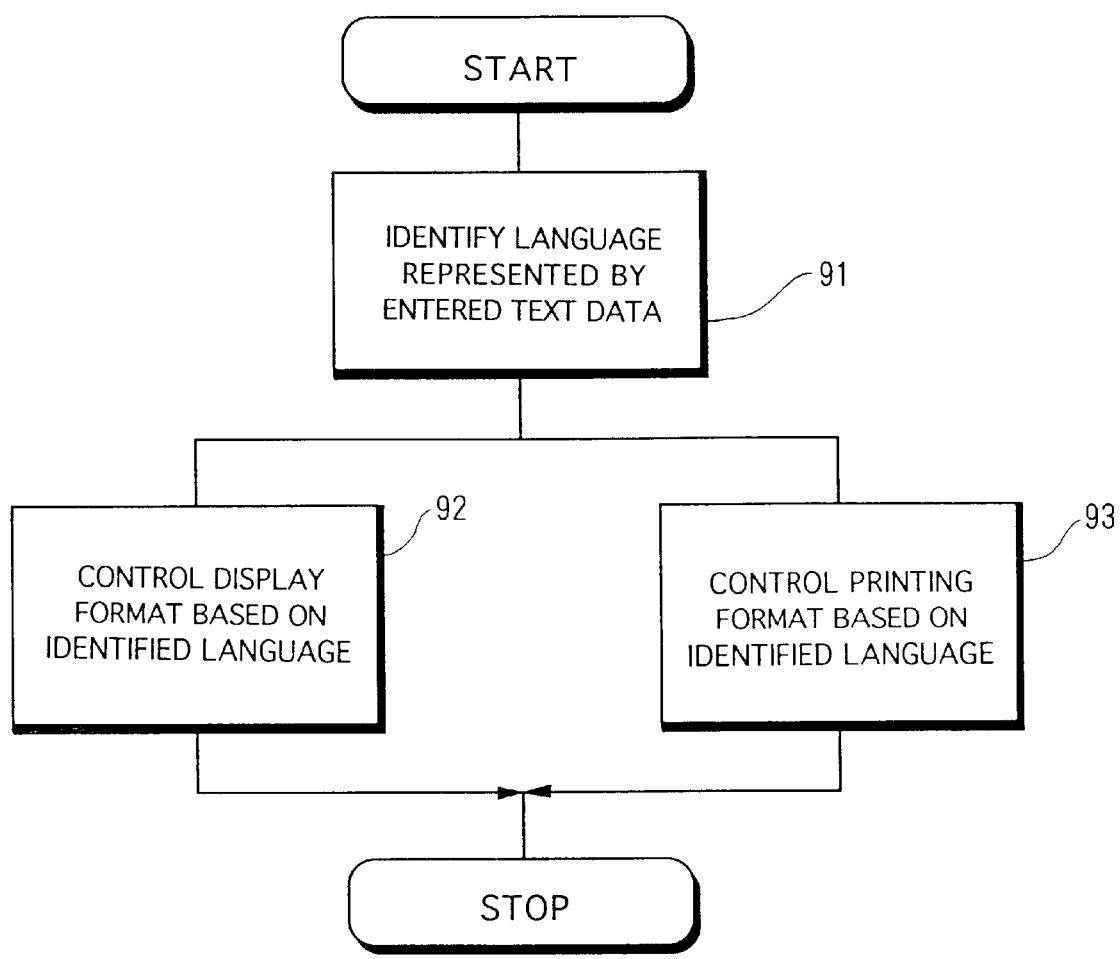
FIG. 12 illustrates the outline of the procedure for processing in the multilingual output system.

A program realizing the procedure for the processing shown in FIG. 12 is stored in a CD-ROM 82. The CD-ROM 82 is loaded in a language identifying device 85, so that the program and data which are stored in the CD-ROM 85 are read.

The text data is entered using an input device 81. The entered text data is fed to the language identifying device 85, a display control device 86 and a printer control device 88. The display control device 86 controls the display of the text on a display device 87. The printer control device 88 controls the printing of the text in a printer 89.

In the language identifying device 85, a language of the text represented by the entered text data is identified (step 91).

When the language is identified, the display control device 86 and the printer control device 88 are controlled by the language identifying device 85 such that display and printing corresponding to the type of the language of the text represented by the entered text data are performed (steps 92 and 93). For example, the type of font displayed or printed (MSP Gothic if the language is Japanese, MS Soug if it is Chinese (for China), Ming LiU if it is Chinese (for Taiwan), or MS Hei if it is Korean), horizontal writing or vertical writing, writing from the left to the right or writing from the right to the left, a character gap, line spacing, and the like are controlled depending on the identified language.

The display format in the display device 87 and the printing format in the printer 89 are thus controlled depending on the type of the language represented by the text data.

Fifth Embodiment

The present embodiment relates to a multilingual translation system.

Figure 13:
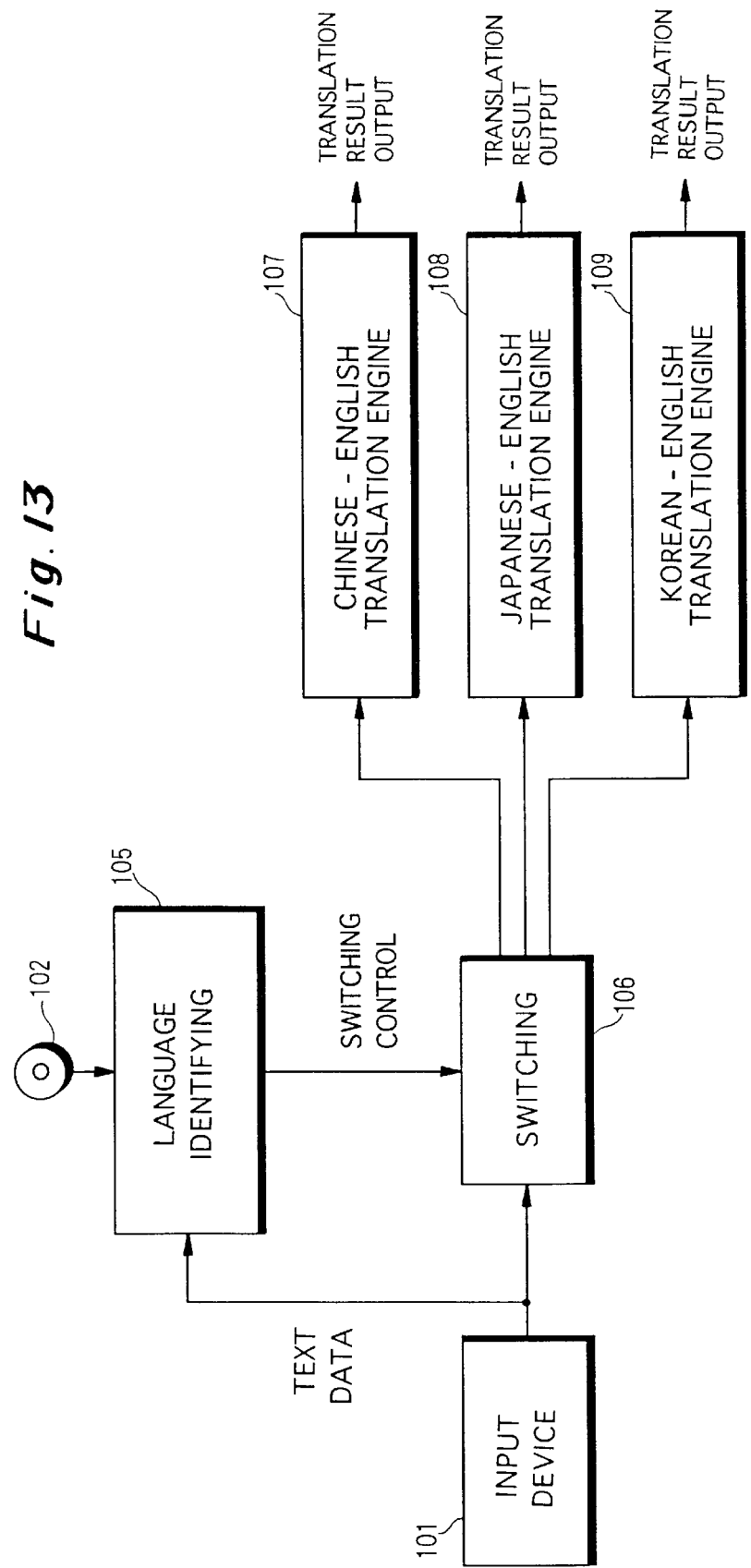
FIG. 13 is a block diagram showing the outline of the electrical construction of a multilingual translation system.
Figure 14:
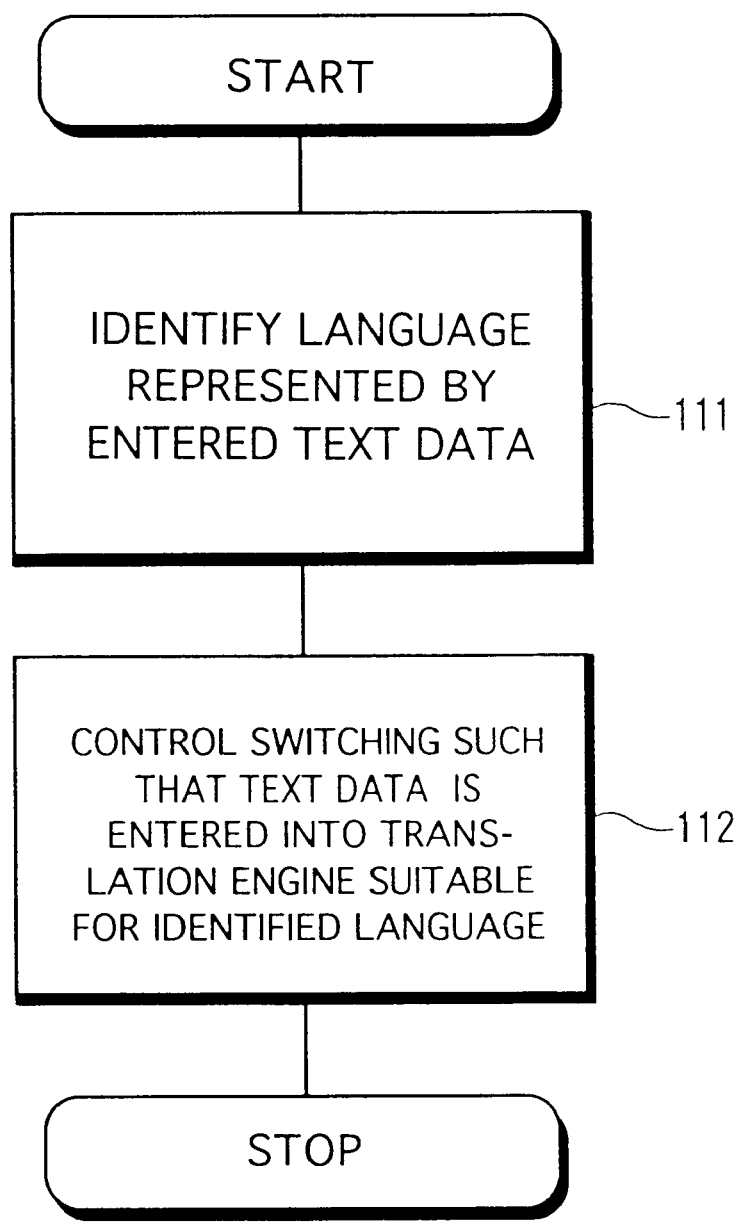
FIG. 14 illustrates the outline of the procedure for processing in the multilingual translation system.

FIG. 13 is a block diagram showing the outline of the electrical construction of the multilingual translation system, and FIG. 14 shows the outline of the procedure for processing.

The multilingual translation system has a plurality of translation engines for respectively translating Chinese, Japanese and Korean into English, and feeds entered text data to the translation engine corresponding to the type of language represented by the entered text data, to perform translation processing.

A program realizing the procedure for the processing shown in FIG. 14 is stored in a CD-ROM 102. The CD-ROM 102 is loaded in a language identifying device 105, so that the program and data which are stored in the CD-ROM 102 are read.

Text data representing a text to be translated is fed from an input device 101, and is entered into the language identifying device 105 and a switching device 106. In the language identifying device 105, a language of the text represented by the entered text data is identified (step 111).

When the language is identified, the switching of the switching device 106 is controlled by the language identifying device 105 such that the entered text data is entered into any one of the translation engines suitable for the language represented by the text data, that is, a translation engine 107 for translating Chinese into English, a translation engine 108 for translating Japanese into English, and a translation engine 109 for translating Korean into English (step 112).

Consequently, the language of the text represented by the entered text data is outputted after being translated into English even if it is any of Japanese, Chinese and Korean. The language identifying device 105, the switching device 106, and the translation engines 107, 108 and 109 can be realized by one or a plurality of computers.

Sixth Embodiment

The present embodiment relates to a multilingual word processor.

Figure 15:
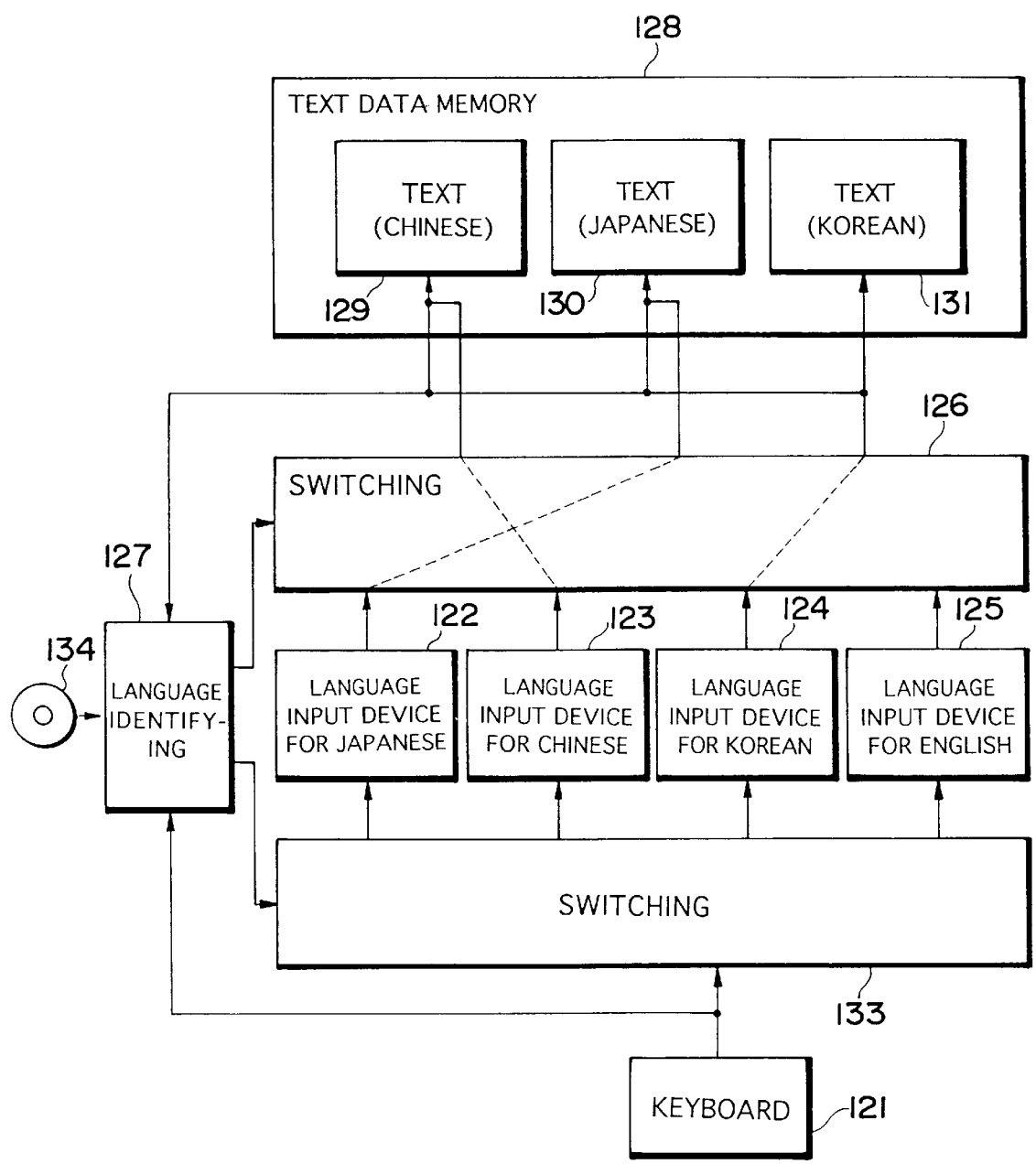
FIG. 15 is a block diagram showing the outline of the electrical construction of a multilingual word processor.
Figure 16:
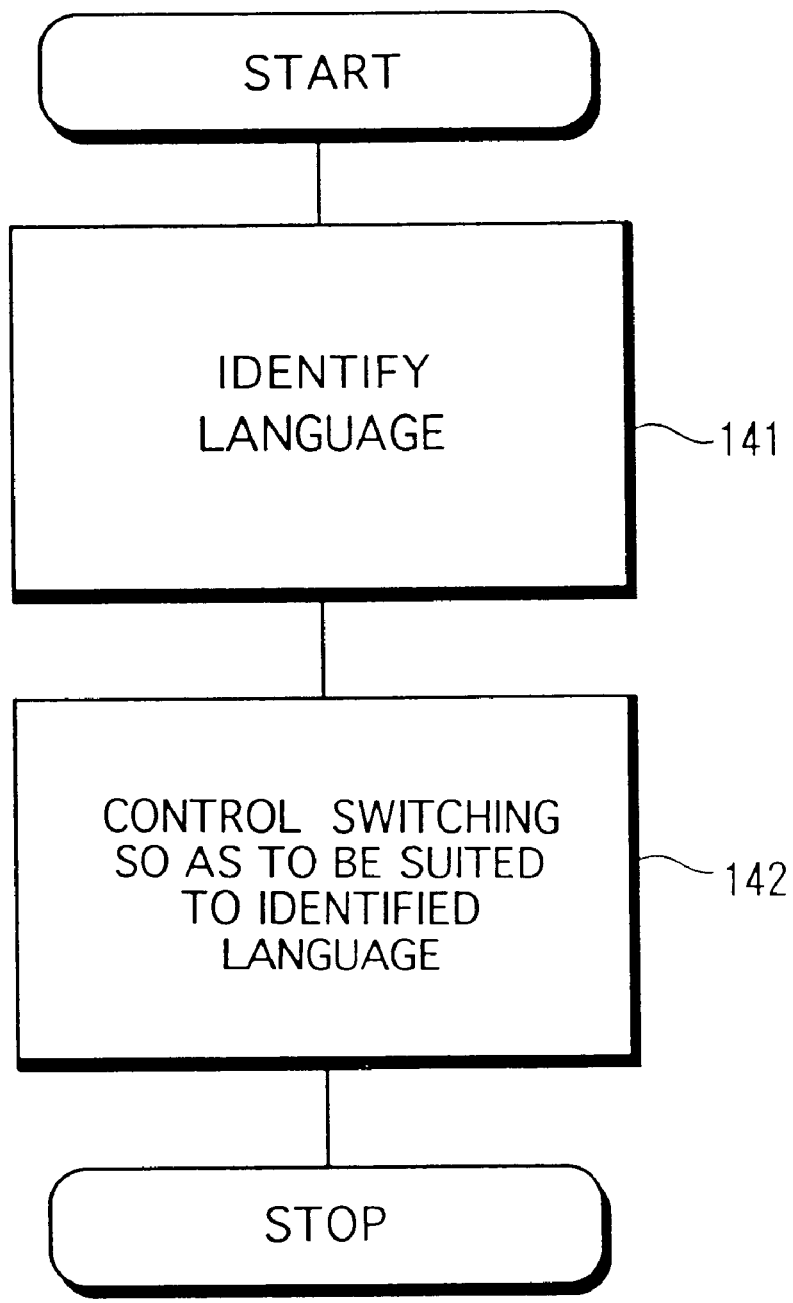
FIG. 16 illustrates the outline of the procedure for processing in the multilingual word processor.

FIG. 15 is a block diagram showing the outline of the electrical construction of the multilingual word processor, and FIG. 16 shows the outline of the procedure for processing (with a plurality of processing in the lump).

A program realizing the procedure for the processing shown in FIG. 16 is stored in a CD-ROM 134. The CD-ROM 134 is loaded in a language identifying device 127, so that the program and data which are stored in the CD-ROM 134 are read.

The multilingual word processor comprises a language input device for Japanese 122, a language input device for Chinese 123, a language input device for Korean 124, and a language input device for English 125. The language input device for Japanese 122 converts text data entered in the Roman alphabet or kana into text data representing a sentence which is a mixture of kana and kanji. The language input device for Chinese 123 converts text data entered in the alphabet into Chinese text data. The language input device for Korean 124 converts, when a component or element constituting hangeul (which may be represented by the alphabet) is entered, the hangeul component into text data constituting hangeul. The language input device for English 125 checks the spelling of a text represented by text data entered in the alphabet.

In any of cases where Japanese text data is entered, where Chinese text data is entered, where Korean text data is entered, and where English text data is entered, a common keyboard 121 is used (different keyboards may be, of course, used depending on the languages).

Text data (text files) representing various languages are stored together in a text data memory 128. In the example shown in FIG. 15, a memory area 129 storing the Chinese text data, a memory area 130 storing the Japanese text data, and a memory area 131 storing the Korean text data are illustrated. When a user designates a desired text file, the text file is read out, and is fed to the language identifying device 127. The language identifying device 127 identifies a language (Japanese, Chinese or English) represented by the text file or text data read out (step 141), and selects a font for display depending on the results of the identification. Consequently, characters with which the language represented by the text data is written are displayed (step 142).

When the user enters the text data in a particular language, the text data entered from the keyboard 121 is fed to the language identifying device 127, so that it is judged which of Japanese, Chinese, Korean and English is related to the entered text data (step 141). When the language is identified, a switching device 133 is switched by the language identifying device 127 such that the text data entered from the keyboard 121 is entered into the corresponding input device 122, 123, 124 or 125 (step 142). The switching of the switching device 126 is controlled such that the text data obtained from the input device (any one of 122, 123, 124 and 125) is finally stored in a file (a memory area) corresponding to the language represented by the text data (step 142). In a case where there is no file corresponding to the language, or a case where there is no memory area of the language, a new file or memory area is formed.

Seventh Embodiment

The present embodiment relates to a multilingual speech synthesis system.

Figure 17:
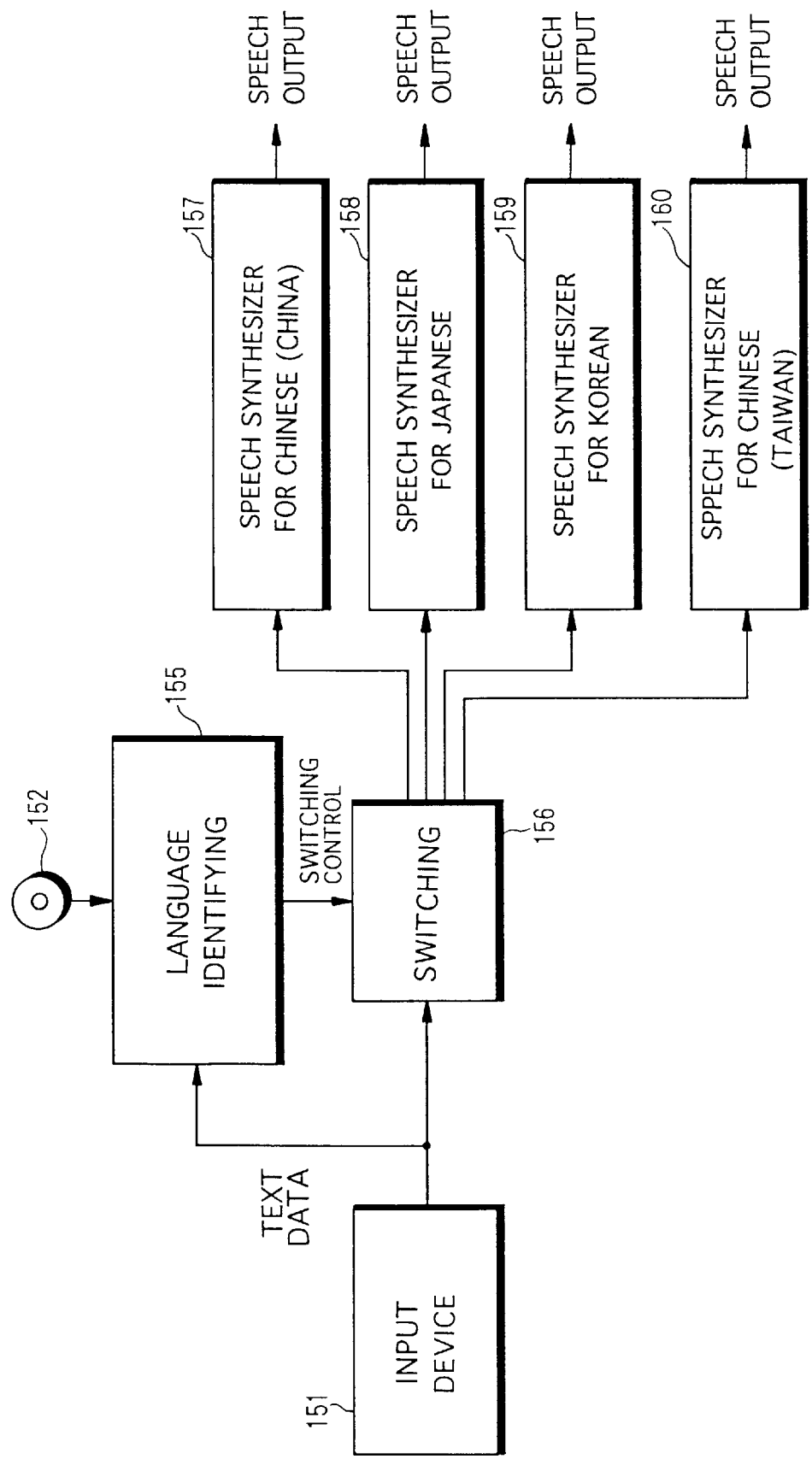
FIG. 17 is a block diagram showing the outline of the electrical construction of a multilingual speech synthesis system.
Figure 18:
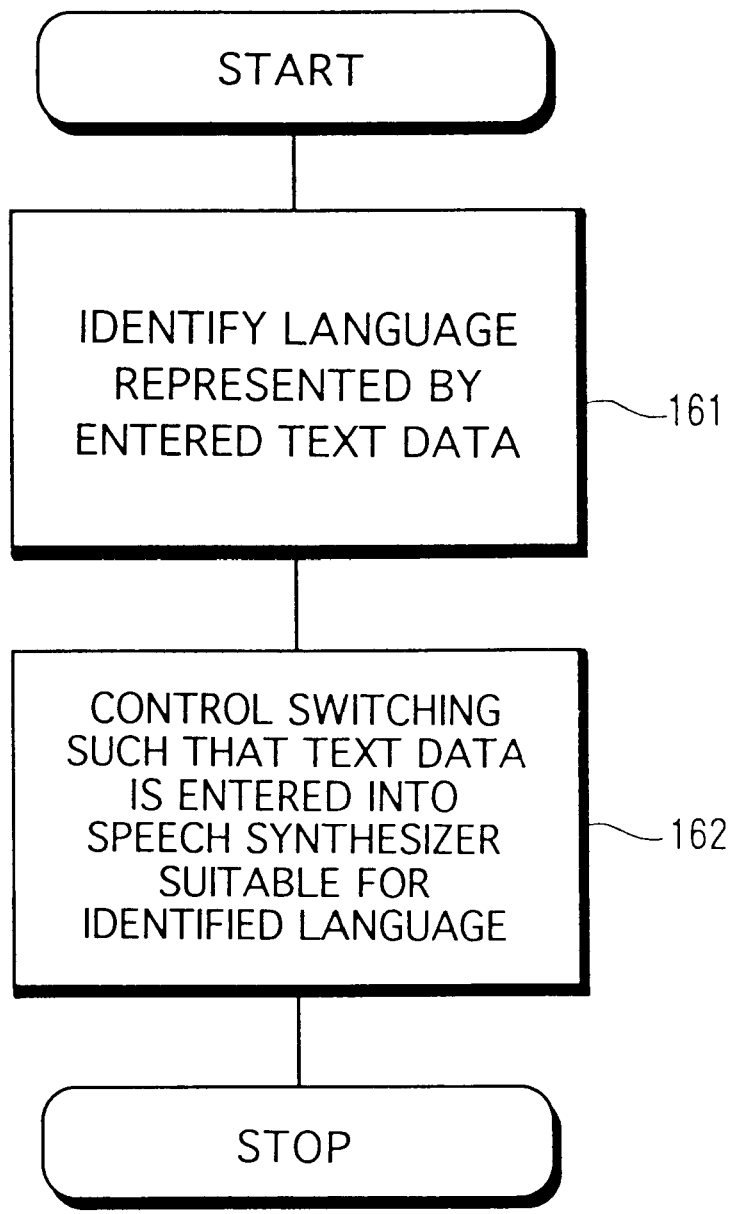
FIG. 18 illustrates the outline of the procedure for processing in the multilingual speech synthesis system.

FIG. 17 is a block diagram showing the electrical construction of the multilingual speech synthesis system, and FIG. 18 shows the outline of the procedure for processing.

The multilingual speech synthesis system outputs a text represented by entered text data in speech (voice) in a language of the text.

A program realizing the procedure for the processing shown in FIG. 18 is stored in a CD-ROM 152. The CD-ROM 152 is loaded in a language identifying device 155, so that the program and data which are stored in the CD-ROM 152 are read.

The multilingual speech synthesis system has a speech (voice) synthesizer 157 for converting Chinese (for China) text data into speech in Chinese generally used in China, a speech synthesizer 158 for outputting Japanese text data in speech in Japanese, a speech synthesizer 159 for outputting, when entered text data is Korean, the Korean text data in speech in Korean, and a speech synthesizer 160 for outputting Chinese (for China) text data in speech in Chinese generally used in Taiwan.

Text data entered from an input device 151 is fed to the language identifying device 155 and a switching device 156. In the language identifying device 155, a language of a text represented by the entered text data is identified (step 161).

When the language is identified, the switching device 156 is controlled such that the entered text data is entered into the speech synthesizer 157, 158, 159 or 160 suitable for the language of the text represented by the text data (step 162). Consequently, the entered text data is entered into the speech synthesizer 157, 158, 159 or 160 suitable for the language of the text represented by the text data. Output of speech in the suitable languages is obtained. The language identifying device 155, the switching device 156, and the speech synthesizers 157 to 160 can be realized by one or a plurality of computers.

Application

The application also relates to a multilingual speech synthesis system.

The multilingual speech synthesis system outputs, even if a language of a text represented by entered text data is a language other than Japanese, the language in speech (voice) in Japanese.

FIG. 19 is a block diagram showing the outline of the electrical construction of the multilingual speech synthesis system.

The multilingual speech synthesis system comprises a translation engine 177 for translating Chinese into Japanese and outputting Japanese, and a translation engine 178 for translating Korean into Japanese and outputting Japanese.

Programs for language identification processing in a language identifying device 175 and switching processing in a switching device 176 depending on the results of the language identification are stored in a CD-ROM 172.

When the CD-ROM 172 is loaded in the language identifying device 175, the programs stored in the CD-ROM 172 are read. The following operations are executed in accordance with the programs.

Text data is entered from an input device 171. The entered text data is fed to the language identifying device 175 and the switching device 176. In the language identifying device 175, a language represented by the entered text data is identified.

When the language is identified, the switching of the switching device 176 is controlled by the language identifying device 175 depending on the identified language. If the entered text data represents a Chinese text, therefore, the text data is fed to the Chinese-Japanese translation engine 177. If the entered text data represents a Korean text, the text data is fed to the Korean-Japanese translation engine 178. The Japanese text data obtained by the translation in the translation engine 177 or 178 is fed to a Japanese speech synthesizer 179, so that output of speech in Japanese is obtained. It goes without saying that if the text data entered into the multilingual speech synthesis system is related to Japanese, the text data outputted from the switching device 176 is directly fed to the Japanese speech synthesizer 179 and is outputted in Japanese.

Although the present invention has been described and illustrated in detail, it is clearly understood that the same is by way of illustration and example only and is not to be taken by way of limitation, the spirit and scope of the present invention being defined only by the terms of the appended claims.

What is claimed is:

1. A language identifying apparatus for identifying a combination of a language represented by encoded text data and its character code system, comprising:

a storage device storing for each combination of a language and a character code system a plurality of occurrence probability tables each describing the probability that a character code occurs in the combination;

means for respectively reading out the occurrence probabilities from said plurality of occurrence probability tables with respect to one or a plurality of character codes included in fed text data, to obtain evaluation data for each combination of the language and the character code system; and means for identifying the combination of the language represented by the fed text data and the character code system based only on the obtained evaluation data.

2. The language identifying apparatus according to claim 1, wherein said means for obtaining the evaluation data respectively calculates the product of the occurrence probabilities read out from the occurrence probability tables.

3. The language identifying apparatus according to claim 1, wherein the means for judging the combination of the language represented by the fed text data and the character code system on the basis of the obtained evaluation data is missing.

4. A language identifying method for identifying a combination of a language represented by encoded text data and its character code system, comprising the steps of:

preparing, for each combination of a language and a character code system, occurrence probability tables each describing the probability that a character code occurs in the combination;

respectively reading out the occurrence probabilities from said plurality of occurrence probability tables with respect to one or a plurality of character codes included in fed text data, to obtain evaluation data for each combination of the language and the character code system; and identifying the combination of the language represented by the fed text data and the character code system based only on the obtained evaluation data.

5. The language identifying method according to claim 4, comprising the step of calculating the product of the occurrence probabilities respectively read out from the occurrence probability tables, to obtain said evaluation data.

6. A storage medium storing a program for identifying a combination of a language represented by encoded text data and its character code system using occurrence probability tables each describing for each combination of a language and a character code system the probability that a character code occurs in the combination, said program controlling a computer so as to respectively read out the occurrence probabilities from said plurality of occurrence probability tables with respect to one or a plurality of character codes included in fed text data, to obtain evaluation data for each combination of the language and the character code system, and to identify the combination of the language represented by the fed text data and the character code system based only on the obtained evaluation data.

7. The storage medium according to claim 6, wherein the storage medium further stores said occurrence probability tables.

8. The storage medium according to claim 6, wherein said program calculates the product of the occurrence probabilities respectively read out from the occurrence probability table for each combination of the language and the character code system, to judge the combination of the language represented by the fed text data and the character code system on the basis of the obtained product.

* * * * *